US008723777B2

(12) United States Patent
Okamoto et al.

(10) Patent No.: US 8,723,777 B2
(45) Date of Patent: May 13, 2014

(54) PANEL CONTROL DEVICE AND PANEL CONTROL SYSTEM

(75) Inventors: Minoru Okamoto, Osaka (JP); Ryutaro Yamanaka, Osaka (JP); Kazuhiro Okabayashi, Kyoto (JP); Yukihiro Sasagawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/560,682

(22) Filed: Jul. 27, 2012

(65) Prior Publication Data

US 2012/0293526 A1 Nov. 22, 2012

Related U.S. Application Data

(63) Continuation of application No. PCT/JP2011/000152, filed on Jan. 13, 2011.

(30) Foreign Application Priority Data

Jan. 27, 2010 (JP) ................................ 2010-015452

(51) Int. Cl.
*G09G 3/36* (2006.01)
*G06F 13/14* (2006.01)

(52) U.S. Cl.
USPC ............................................ 345/98; 345/519

(58) Field of Classification Search
CPC ........... G06F 3/1431; H04N 5/04; H04N 5/06
See application file for complete search history.

(56) References Cited

U.S. PATENT DOCUMENTS

| | | | | |
|---|---|---|---|---|
| 5,282,129 | A * | 1/1994 | Losic et al. | 700/32 |
| 6,518,970 | B1 * | 2/2003 | Glen et al. | 345/501 |
| 6,781,586 | B1 | 8/2004 | Ohta | |
| 6,784,881 | B2 * | 8/2004 | Wasserman et al. | 345/213 |
| 6,816,139 | B2 | 11/2004 | Park | |
| 2010/0110085 | A1 * | 5/2010 | Samuel et al. | 345/519 |

FOREIGN PATENT DOCUMENTS

| | | |
|---|---|---|
| JP | 2001-134753 | 5/2001 |
| JP | 2001-343927 | 12/2001 |
| JP | 2002-244629 | 8/2002 |
| JP | 2005-266593 | 9/2005 |
| JP | 2007-293556 | 11/2007 |
| JP | 2007293556 A * | 11/2007 |

OTHER PUBLICATIONS

Toshiba, "TC90413XBG Single Chip SoC for ATSC LCD TV", Nov. 2007.*

"Dedicated," http://dictionary.reference.com/browse/dedicated?s=t&path=/ retrieved Jul. 24, 2013.*

International Search Report issued in International Patent Application No. PCT/JP2011/000152, mailed Mar. 15, 2011.

* cited by examiner

*Primary Examiner* — Kee M Tung
*Assistant Examiner* — Nicholas R Wilson
(74) *Attorney, Agent, or Firm* — McDermott Will & Emery LLP

(57) ABSTRACT

A panel control device includes a programmable array. This programmable array operates in accordance with a configuration code and includes a plurality of first-class elements and at least one second-class element. This provides a panel control device requiring a small circuit area, being suitable for system-on-chip (SoC) mounting, and driving a liquid crystal display device having various specifications also in the future.

13 Claims, 12 Drawing Sheets

FIG.8A

220

24 BITS

| ADDRESS | | | | | | |
|---|---|---|---|---|---|---|
| 0 | R1L | R1U | G1L | G1U | B1L | B1U |
| 1 | R3L | R3U | G3L | G3U | B3L | B3U |
| 2 | | | | | | |
| … | | | | | | |

FIG.8B

222

24 BITS

| ADDRESS | | | | | | |
|---|---|---|---|---|---|---|
| 0 | R2L | R2U | G2L | G2U | B2L | B2U |
| 1 | R4L | R4U | G4L | G4U | B4L | B4U |
| 2 | | | | | | |
| … | | | | | | |

FIG.11A

220

24 BITS

| ADDRESS | | | | | | |
|---|---|---|---|---|---|---|
| 0 | R1L | R1U | G1L | G1U | B1L | B1U |
| 1 | R2L | R2U | G2L | G2U | B2L | B2U |
| 2 | | | | | | |
| ... | | | | | | |

FIG.11B

222

24 BITS

| ADDRESS | | | | | | |
|---|---|---|---|---|---|---|
| 0 | R9L | R9U | G9L | G9U | B9L | B9U |
| 1 | R10L | R10U | G10L | G10U | B10L | B10U |
| 2 | | | | | | |
| ... | | | | | | |

PANEL CONTROL DEVICE AND PANEL CONTROL SYSTEM

CROSS-REFERENCE TO RELATED APPLICATION

This is a continuation of PCT International Application PCT/JP2011/000152 filed on Jan. 13, 2011, which claims priority to Japanese Patent Application No. 2010-015452 filed on Jan. 27, 2010. The disclosures of these applications including the specifications, the drawings, and the claims are hereby incorporated by reference in their entirety.

BACKGROUND

The present disclosure relates to panel control devices flexibly outputting video data and control signals to liquid crystal display devices, and more particularly to panel control devices including a plurality of types of programmable elements, controlling various liquid crystal display devices, having small circuit areas, and being suitable for system-on-chip (SoC) mounting.

In recent years, various liquid crystal display devices have been used for computer displays and digital televisions. In order to output video data and control signals to the liquid crystal display devices, the devices are generally combined with a panel control device (also referred to as a panel driving device, a panel controller, a timing controller, a T-CON, etc.). (See Japanese Patent Publication No. 2002-244629 and Japanese Patent Publication No. 2005-266593.)

This panel control device needs to output the video data and the control signals at timing exactly meeting the specification of the liquid crystal display device. If output is not made in accordance with the specification, the viewer cannot see a precise image. Therefore, the video data and the control signals cannot be directly output from a microcomputer, etc.

On the other hand, the specifications of a liquid crystal display device depend on the manufacturer and the serial number of the liquid crystal display device. The operation and specification of a panel control device need to be flexibly determined in detail in accordance with the specification of the liquid crystal display device. The specifications of liquid crystal display devices will continue to variously change so as to display beautiful images also in the future.

On the other hand, semiconductor manufacturing techniques have been significantly miniaturized, and what is called a system-on-chip (SoC) can be provided, which builds a conventional system formed by a plurality of large scale integrations (LSIs) with a single LSI. As a result, reduction in costs for parts due to reduction in the number of LSIs forming a system, reduction in the LSI mounting area, and lower power consumption of the system due to unnecessity of LSI-to-LSI signal communications are demanded by customers.

For example, Japanese Patent Publication No. 2002-244629 shows a panel driving device including a microcontroller, a data converter controlled by the microcontroller, and a panel controller also controlled by the microcontroller, and teaches providing the panel driving device for driving a panel of a liquid crystal display device having various specifications.

Japanese Patent Publication No. 2005-266593 teaches including inside a display unit (i.e., a liquid crystal display device), a memory of information or a program determining the timing of a data signal line drive circuit and a scan signal line drive circuit, which drive a pixel array, and outputting the information output from the memory to a programmable logic IC which implements the function of a panel controller or a display sequencer.

SUMMARY

In the above-described conventional configuration, however, a panel control device, which drives a liquid crystal display device having various specifications also in the future, cannot be built in a SoC forming a digital television system.

Although Japanese Patent Publication No. 2002-244629 provides the panel driving system for the liquid crystal display device having various specifications, it is reasonable to consider that a block to be controlled by the microcontroller is formed by an application specific integrated circuit (ASIC). That is, the panel driving system of Japanese Patent Publication No. 2002-244629 may be able to correspond to a liquid crystal display device having various specifications, which were known at the time of designing the panel driving system. However, the panel driving system cannot drive a panel of a future liquid crystal display device, exceeding the handling of a panel driving system which has already been designed.

Japanese Patent Publication No. 2005-266593 provides a solution to this problem. Japanese Patent Publication No. 2005-266593 teaches using a programmable logic IC to implement the function of a panel controller or a display sequencer. The publication shows a field programmable gate array (FPGA), a programmable array logic (PAL), and a programmable logic array (PLA) as examples of the programmable logic IC. In general, these programmable logic ICs have sufficient versatility, and thus may be able to drive a panel of a future liquid crystal display device if there is information or a program for determining the timing of the data signal line drive circuit and the scan signal line drive circuit shown in Japanese Patent Publication No. 2005-266593. However, such a programmable logic IC requires a large circuit area (from tens to hundreds times of a dedicated circuit) and cannot be thus built in a SoC. That is, the configuration shown in Japanese Patent Publication No. 2005-266593 is inevitably mounted in a dedicated independent LSI.

In view of the problems, it is an objective of the present disclosure to provide a panel control device requiring a small circuit area, being suitable for SoC mounting, and driving a liquid crystal display device having various specifications also in the future.

In order to achieve the objective, the present disclosure provides a panel control device for outputting video data and a control signal to a liquid crystal display device. The panel control device includes a programmable array configured to receive the video data, a vertical synchronization signal, and a horizontal synchronization signal, and to operate in accordance with a configuration code including information on specifications of the video data and the control signal of the liquid crystal display device; and a first memory configured to input/output data to/from the programmable array. The programmable array includes a plurality of first-class elements and at least one second-class element.

With this configuration, the present disclosure provides the panel control device requiring a small circuit area and having flexibility in driving a liquid crystal display device having various specifications also in the future.

As described above, according to the present disclosure, the panel control device includes a programmable array, which includes a plurality of first-class elements and at least one second-class element, each of which operates in accordance with a configuration code. With this configuration, the present disclosure provides the panel control device requiring a small circuit area, being suitable for SoC mounting, and driving a liquid crystal display device having various specifications also in the future.

BRIEF DESCRIPTION OF THE DRAWINGS

FIGS. 8A and 8B illustrate example memory storage of the video data in the panel control device of FIG. 1.

FIGS. 11A and 11B illustrate another example memory storage of the video data in the panel control device of FIG. 1.

DETAILED DESCRIPTION

Figure 1:
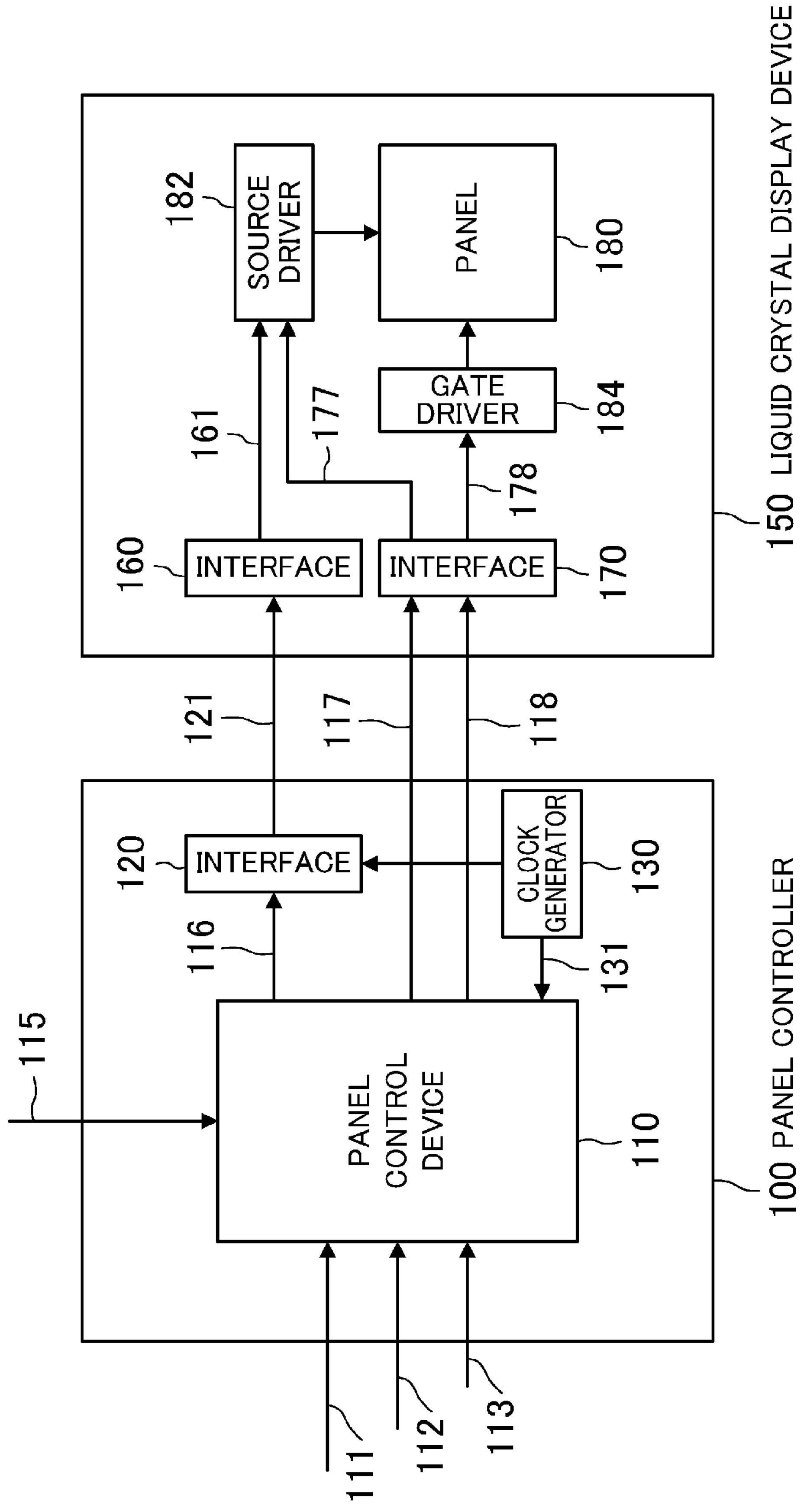
FIG. 1 is a block diagram of a configuration example of a panel control system including a panel control device according to the present disclosure.

FIG. 1 illustrates a panel control system including a panel control device according to an embodiment of the present disclosure. A panel controller 100 includes a panel control device 110, an interface 120 transferring video data 116 output from the panel control device 110 to a liquid crystal display device 150, and a clock generator 130 outputting a clock signal 131 to the panel control device 110 and the interface 120. The panel control device 110 receives video data 111 of three colors of R, G, and B, a vertical synchronization signal 112, and a horizontal synchronization signal 113. The panel control device 110 outputs the video data 116 formed by changing the output order of the video data 111 in accordance with a configuration code 115, and control signals 117 and 118 meeting the specification of the liquid crystal display device 150.

The liquid crystal display device 150 coupled to the panel controller 100 includes an interface 160 receiving video data 121 output from the interface 120, an interface 170 receiving the control signals 117 and 118, a source driver 182 receiving video data 161 output from the interface 160 and a control signal 177 output from the interface 170, and driving a panel 180 from a horizontal direction, and a gate driver 184 receiving a control signal 178 output from the interface 170, and driving the panel 180 from a vertical direction.

Figure 2:
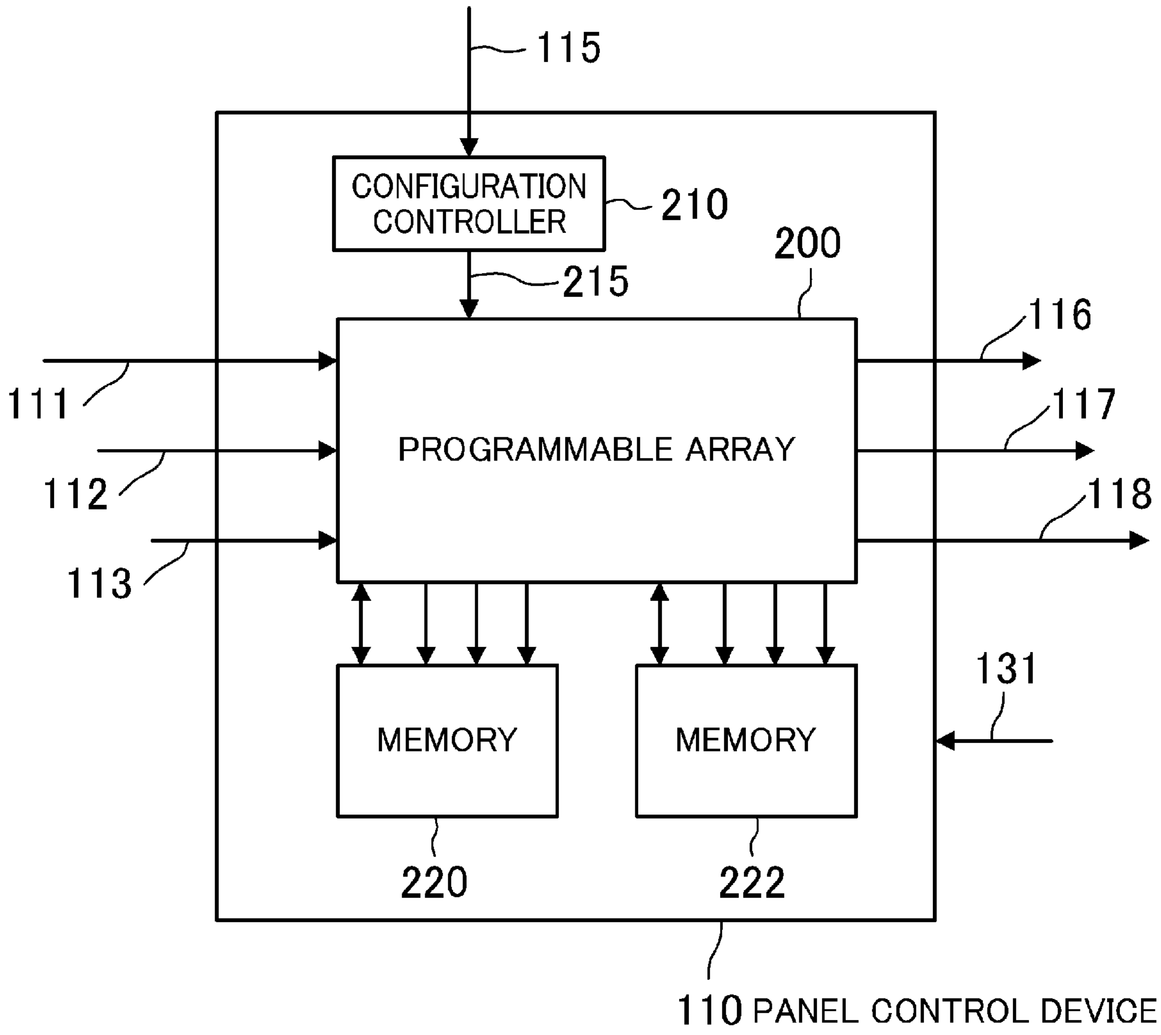
FIG. 2 is a block diagram of a specific configuration example of the panel control device of FIG. 1.

FIG. 2 illustrates a more detailed configuration of the panel control device 110. The configuration code 115 supplied from outside (not shown) is input to a configuration controller 210. A configuration code 215 is sequentially downloaded 1 bit by 1 bit to an element inside a programmable array 200 as appropriate to define operation of the programmable array 200. Detailed operation will be described later. The programmable array 200 receives the video data 111, the vertical synchronization signal 112, and the horizontal synchronization signal 113, and operates in accordance with the downloaded configuration code 215. The programmable array 200 is coupled to memories 220 and 222. The programmable array 200 operates in combination with the memories 220 and 222, thereby outputting the video data 116 according to the specification of the liquid crystal display device 150, and the control signals 117 and 118. Detailed operation will be described later.

Figure 3:
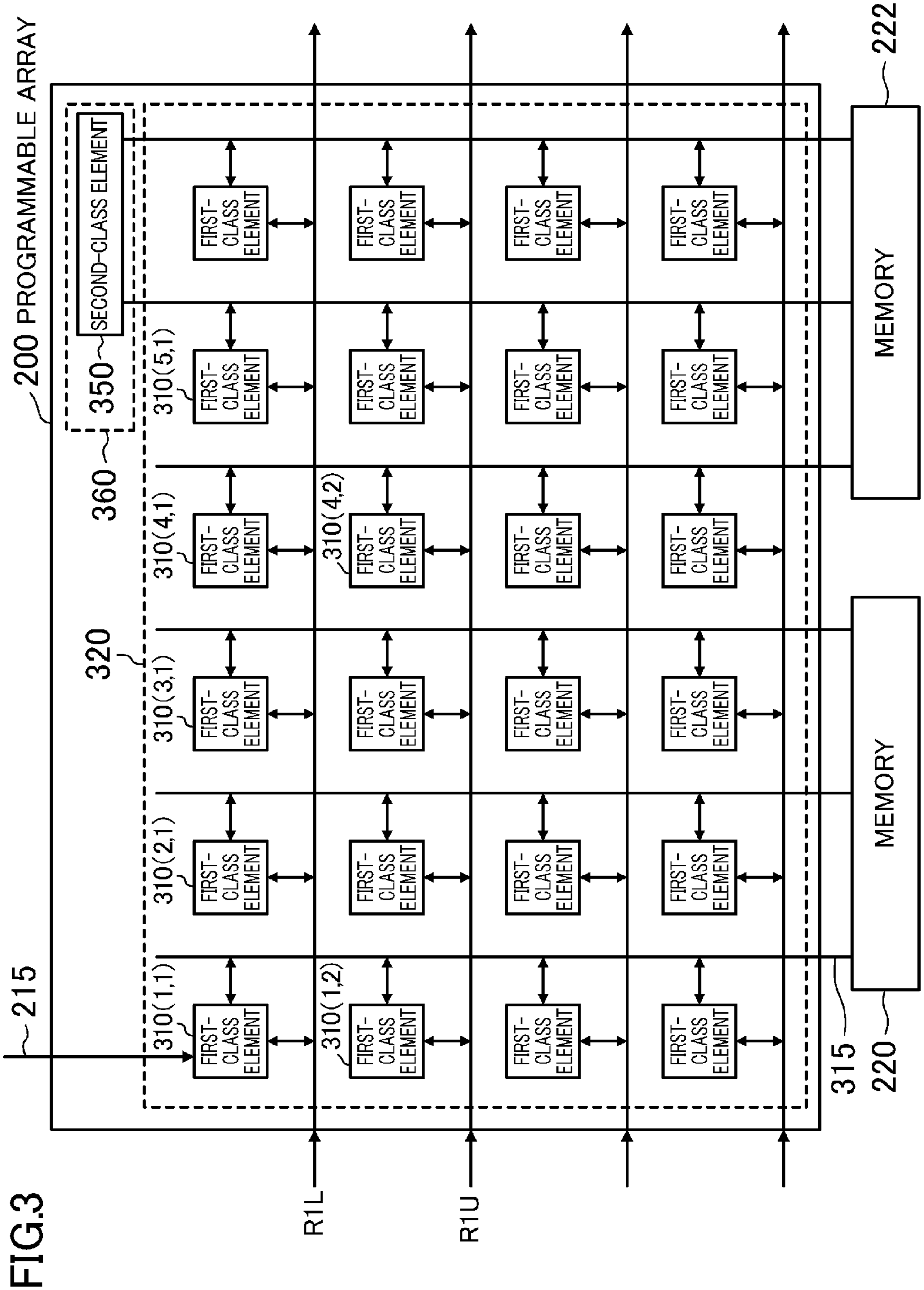
FIG. 3 is a block diagram of a specific configuration example of a programmable array of FIG. 2.

FIG. 3 illustrates the configuration of the programmable array 200. The programmable array 200 includes a first region 320 including a plurality of first-class elements 310, and a second region 360 including at least one second-class element 350. The plurality of first-class elements 310 are coupled to the second-class element 350 by a bus 315. Unless described otherwise herein, the data widths of the programmable arrays 200 are all 4 bits.

The bus 315 is a programmable bus, by which, based on the configuration code, connections between: the first-class elements; the second-class elements; one of the first-class and second-class elements and one of an input of the programmable array 200, the video data 111, the vertical synchronization signal 112 and the horizontal synchronization signal 113; one of the first-class and second-class elements and one of an output of the programmable array 200, the video data 116 and the control signals 117, 118; or one of the first-class and second-class elements and the memories 220, 222, can be selected.

The bus 315 can also select connections between: one of the input of the programmable array 200, the video data 111, the vertical synchronization signal 112 and the horizontal synchronization signal 113 and the memories 220, 222; or one of the output of the programmable array 200, the video data 116 and the control signals 117, 118 and the memories 220, 222. Further, the bus 315 enables the output of the programmable array 200 to be input to the memories after being synchronized in the first-class element or the second-class element.

Figure 4:
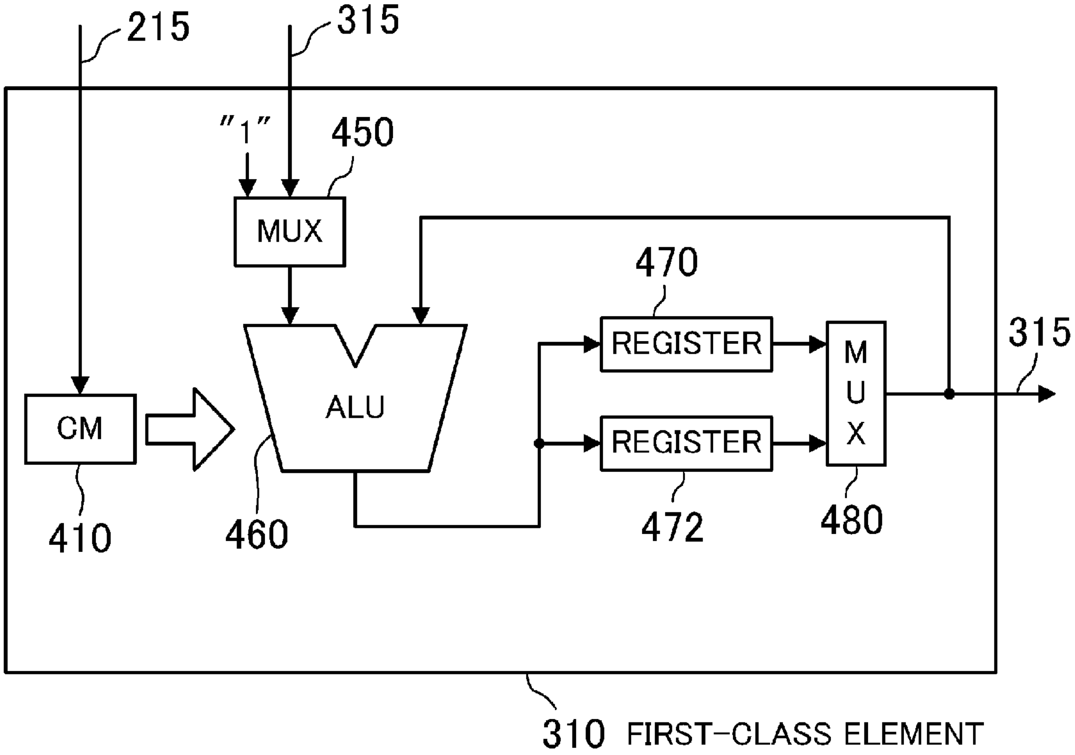
FIG. 4 is a block diagram of a specific configuration example of a first-class element of FIG. 3.

FIG. 4 illustrates a more detailed configuration of the first-class element 310. The first-class element 310 includes a configuration memory (CM) 410 storing the configuration code 215 as control information, an arithmetic and logic unit (ALU) 460 operating based on the control information output from the configuration memory 410, a plurality of registers 470 and 472 holding output data of the ALU 460 based on the control information output from the configuration memory 410, a multiplexer (MUX) 480 selecting one of outputs of the plurality of registers 470 and 472 based on the control information output from the configuration memory 410, and outputting the selected output to the bus 315 or to the ALU 460, and a multiplexer (MUX) 450 supplying fixed data or data obtained from another first-class element 310 to the ALU 460 via the bus 315. Note that the data widths of the first-class elements 310 are all 4 bits.

Figure 5:
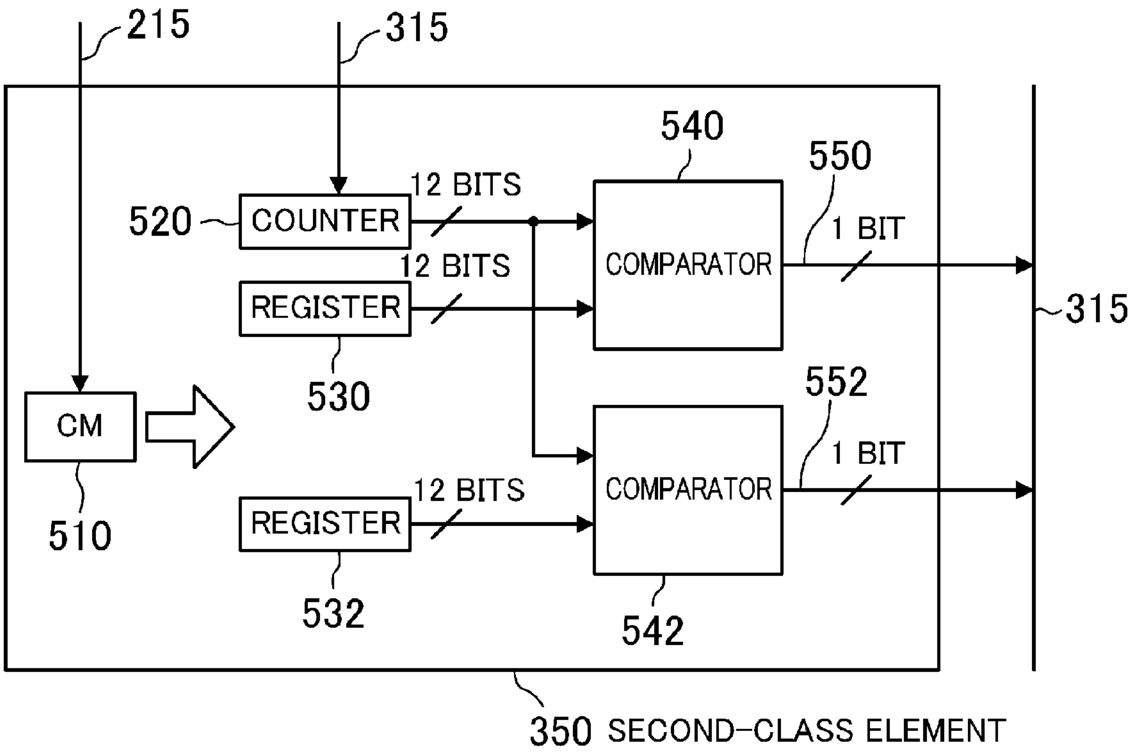
FIG. 5 is a block diagram of a specific configuration example of a second-class element of FIG. 3.

FIG. 5 illustrates a more detailed configuration of each second-class element 350. The second-class element 350 includes a configuration memory (CM) 510 storing the configuration code 215 as control information, a counter 520 of a 12-bit width receiving the horizontal synchronization signal 113 via the bus 315, a register 530 of a 12-bit width holding a first comparison value, a register 532 of a 12-bit width holding a second comparison value, a comparator 540 comparing an output of the counter 520 to an output of the register 530 and supplying a comparison result 550 of 1 bit to the bus 315, and a comparator 542 comparing an output of the counter 520 to an output of the register 532 and supplying a comparison result 552 of 1 bit to the bus 315.

The panel control device 110 executes two types of processing. The first processing is changing the order of the video data 111 to meet the specification of the coupled liquid crystal display device 150 and then outputting the video data 111 as the video data 116. The second processing is generating the control signals 117 and 118 suitable for driving the source driver 182 and the gate driver 184 included in the liquid crystal display device 150.

Case 1 where the Order of the Video Data 111 is Changed, and the Video Data 111 is Output as the Video Data 116

First, example processing of the video data 111 will be described below in detail.

Figure 6:
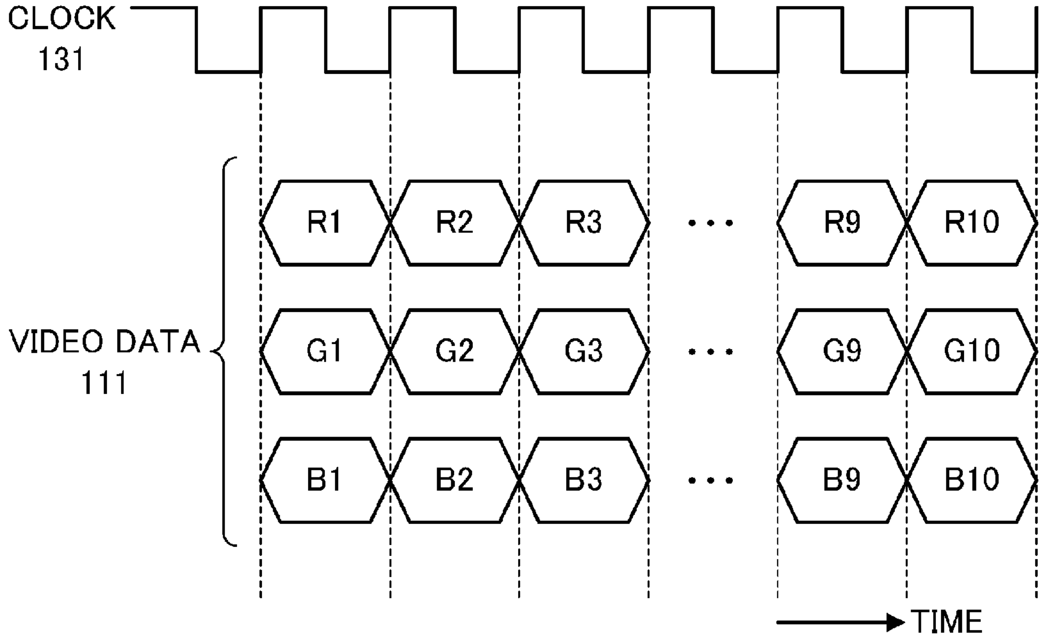
FIG. 6 illustrates example input timing of video data in the panel control device of FIG. 1.
Figure 10:
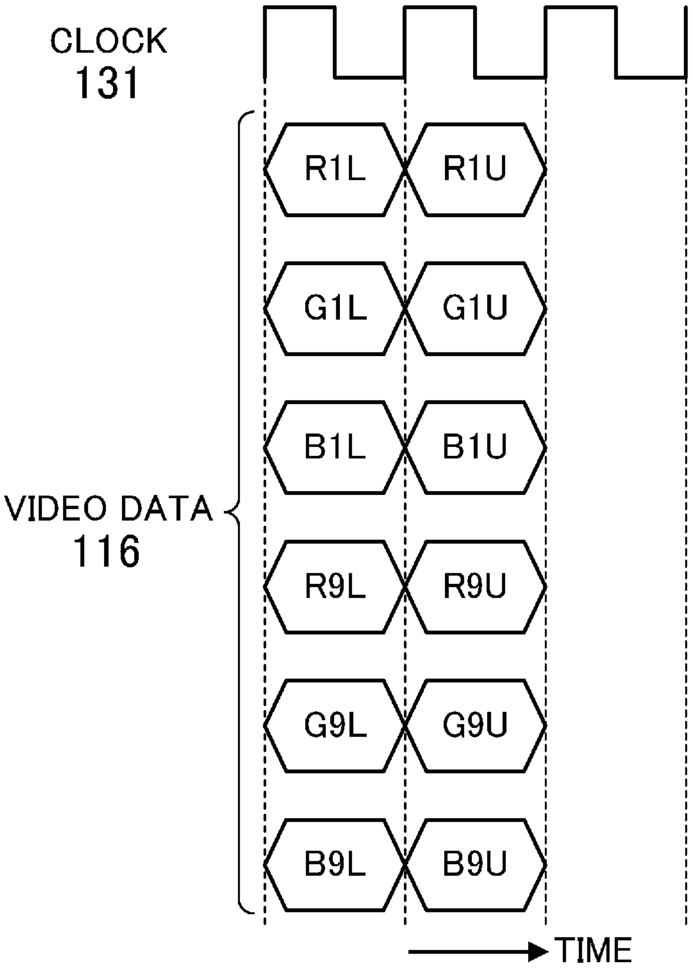
FIG. 10 illustrates another example output timing of the video data in the panel control device of FIG. 1.

The video data 111 includes three types of data of R, G, and B, each of which has 8 bits. The video data 111 is input to the programmable array 200 at the timing shown in FIG. 6. The video data may be output from the programmable array 200, for example, at the timing shown in FIG. 7, or may be, for example, at the timing shown in FIG. 10, depending on the liquid crystal display device 150. R1 shown in FIG. 6 represents the first R (red) data received in synchronization with the clock signal 131, and R2 represents the second data. Reference characters for G (green) and B (blue) data represent similarly. The last letters L and U in FIGS. 7 and 10 represent lower 4 bits and higher 4 bits, respectively.

Figure 7:
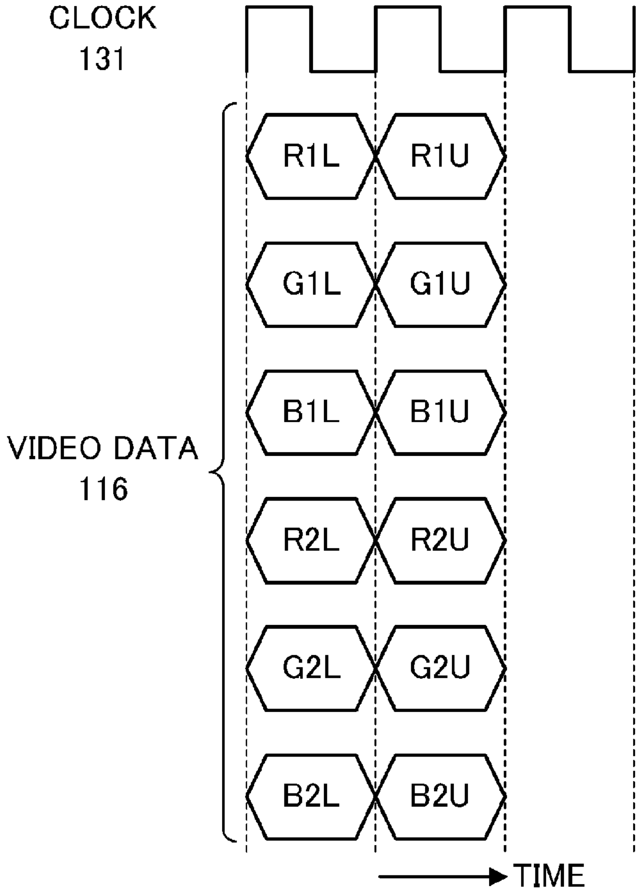
FIG. 7 illustrates example output timing of the video data in the panel control device of FIG. 1.

Case 1A where the Video Data 116 is Output at the Timing Shown in FIG. 7

The configuration code 115 stored in a read-only-memory (not shown; e.g., ROM) in advance is downloaded to the programmable array 200 (FIG. 2). The configuration code 115 is input to the configuration controller 210. The configuration code 215, which is an output of the configuration controller 210, is sequentially output to the plurality of first-class elements 310 and the second-class element 350 (FIGS. 3, 4, and 5). As a result, the configuration code 215 is stored in the configuration memories (CM) 410 and 510 of all the first-class elements 310 and the second-class element 350 included in the programmable array 200. In this embodiment, although a mechanism of storage in the configuration memories 410 and 510 is not described, the configuration code 215 may be sequentially stored 1 bit by 1 bit, or a plurality of bits may be stored at once in the configuration memories 410 in the plurality of first-class elements 310 or the configuration memory 510 in the second-class element 350. This operation will be hereinafter referred to as configuration. As shown in FIG. 3, the plurality of first-class elements 310 are identified as, for example, (1, 1) in the horizontal direction (i.e., an X direction) and the vertical direction (i.e., along a Y axis) in which the first-class elements 310 are two-dimensionally arranged.

When the configuration ends, a first-class element 310 (1, 1) outputs an address to the memories 220 and 222 via the bus 315. This operation can be performed by using a 4-bit counter as the first-class element 310 (1, 1). Specifically, the operation is, for example, performed by the following process. In FIG. 4, the multiplexer 450 selects a fixed value 1 and outputs the value to the ALU 460, the ALU 460 executes addition, the addition result is held in the register 470, and the multiplexer 480 selects the register 470 and outputs the addition result to the ALU 460, and the bus 315 coupled to the first-class element 310 (1, 1). If the address requires 5 or more bits, a structure similar to the first-class element 310 (1, 1) can be provided in combination with another first-class element such as a first-class element 310 (1, 2). This can be easily thought of and is thus not described herein.

The configuration allows a first-class element 310 (2, 1) to output a write signal or a read signal to the memory 220 via the bus 315, and a first-class element 310 (3, 1) to output a write signal or a read signal to the memory 222 via the bus 315. At this time, the first-class element 310 (2, 1) and the first-class element 310 (3, 1) alternately activate the write signals in every one cycle.

The configuration allows a first-class element 310 (4, 1) and a first-class element 310 (4, 2) to perform latch operation of delaying input data by one cycle. The operation is, for example, performed by the following process. In FIG. 4, the multiplexer 450 selects the bus 315 as an input, the ALU 460 outputs an output of the multiplexer 450 without any change, the register 470 holds the output, and the multiplexer 480 selects the register 470 and outputs the output to the bus 315.

Next, the video data 111 is input to the programmable array 200 (FIG. 2). As already described above, the video data 111 is input to the programmable array 200 at the timing shown in FIG. 6. Although only R of R, G, and B will be described below, similar operation is made with respect to the other two colors.

First, in the first clock cycle, the first-class element 310 (1, 1) outputs an address 0 to the memories 220 and 222. At the same time, the first-class element 310 (2, 1) outputs an active write signal to the memory 220, and the first-class element 310 (3, 1) outputs an inactive write signal to the memory 222. At the same time, R1L and R1U, which are lower 4 bits and higher 4 bits of data R1 input as shown in FIGS. 3 and 6, are output to the memory 220 via the bus 315 without any change. As a result, R1L and R1U are written in the address 0 of the memory 220. With respect to the two colors G and B, as a result of similar operation, data is stored in the address 0 of the memory 220 as shown in FIG. 8A.

In the second clock cycle, the first-class element 310 (1, 1) outputs the same address 0 to the memories 220 and 222. At the same time, the first-class element 310 (2, 1) outputs an inactive write signal to the memory 220, and the first-class element 310 (3, 1) outputs an active write signal to the memory 222. At the same time, R2L and R2U, which are lower 4 bits and higher 4 bits of data R2 input as shown in FIGS. 3 and 6, are output to the memory 222 via the bus 315 without any change. As a result, R2L and R2U are written in the address 0 of the memory 222. With respect to the two colors G and B, as a result of similar operation, data is stored in the address 0 of the memory 222 as shown in FIG. 8B.

In the third clock cycle, the first-class element 310 (1, 1) outputs the value incremented by one, i.e., an address 1, to the memories 220 and 222. Then, the first-class element 310 (2, 1) and the first-class element 310 (3, 1) operate the above-described operation, thereby storing the video data 111 in the memories 220 and 222 as shown in FIGS. 8A and 8B.

After the sequence of write operation, data is read from the memories 220 and 222.

Figure 9:
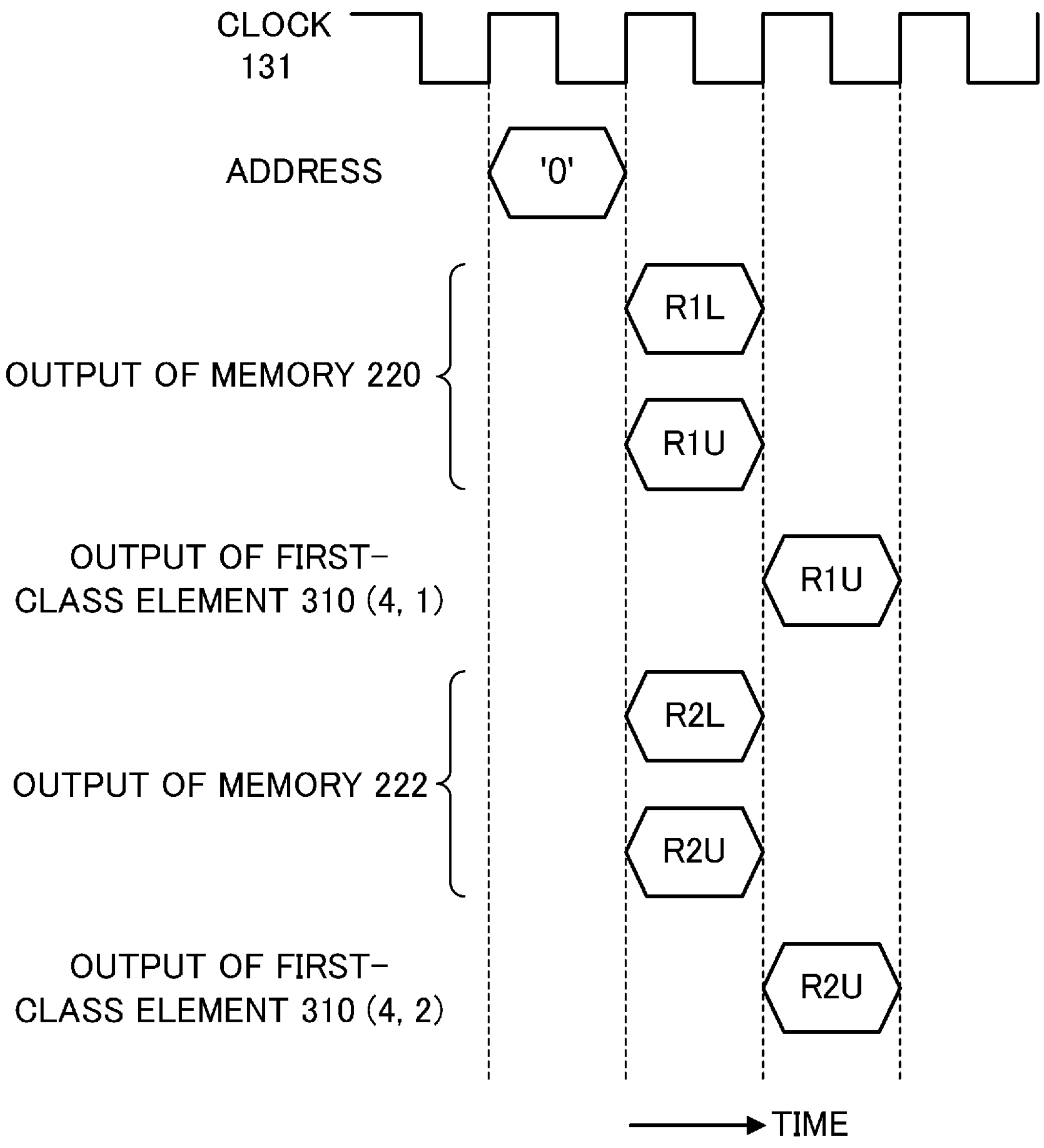
FIG. 9 illustrates example operation timing of a programmable array of FIG. 3.

First, the first-class element 310 (1, 1) outputs the address 0 to the memories 220 and 222. At the same time, the first-class element 310 (2, 1) outputs an active read signal to the memory 220, and the first-class element 310 (3, 1) outputs an active read signal to the memory 222. As a result, as shown in FIG. 9, R1L and R1U are output from the memory 220, and R2L and R2U are output from the memory 222.

In the next cycle, R1L and R2L are output as the video data 116 outside the programmable array 200 via the bus 315. At the same time, R1U and R2U are latched by the first-class element 310 (4, 1) and the first-class element 310 (4, 2) respectively, and are output as the video data 116 outside the programmable array 200 via the bus 315 in the further next cycle. With respect to the two colors G and B, similar operation is executed, thereby outputting the video data 116 from the programmable array 200 at the timing shown in FIG. 7.

Case 1B where the Video Data 116 is Output at the Timing Shown in FIG. 10

The operation of configuration is the same as described above. Specifically, the configuration code 115 stored in a read-only-memory (not shown; e.g., ROM) in advance is input to the configuration controller 210. The configuration code 215, which is an output of the configuration controller 210, is sequentially output to the plurality of first-class elements 310 and the second-class element 350 (FIGS. 3, 4, and 5). As a result, the configuration code 215 is stored in the configuration memories 410 and 510 of all the first-class elements 310 and the second-class element 350 included in the programmable array 200. As clear from the following description, the configuration code 115 used in this case differs from that in the case 1A. Thus, the first-class elements 310 operate differently from those in the case 1A.

When the configuration ends, the first-class element 310 (1, 1) outputs an address to the memories 220 and 222 via the bus 315. If an address requires 5 or more bits, a structure similar to the first-class element 310 (1, 1) can be provided in combination with another first-class element such as a first-class element 310 (1, 2). This can be easily thought of and is thus not described herein.

The configuration allows the first-class element 310 (2, 1) to output a write signal or a read signal to the memory 220 via the bus 315, and the first-class element 310 (3, 1) to output a write signal or a read signal to the memory 222 via the bus 315. At this time, the first-class element 310 (2, 1) activates the write signal until the first-class element 310 (1, 1) outputs as an address 8 (i.e., 8th address). After the first-class element 310 (1, 1) outputs as the 8th address, the first-class element 310 (3, 1) activates the write signal.

The configuration allows a first-class element 310 (4, 1) and a first-class element 310 (4, 2) to perform latch operation of delaying input data by one cycle.

Next, the video data 111 is input to the programmable array 200 (FIG. 2). As already described above, the video data 111 is input to the programmable array 200 at the timing shown in FIG. 6. Although only R of R, G, and B will be described below, similar operation is made with respect to the other two colors.

First, in the first clock cycle, the first-class element 310 (1, 1) outputs an address 0 to the memories 220 and 222. At the same time, the first-class element 310 (2, 1) outputs an active write signal to the memory 220, and the first-class element 310 (3, 1) outputs an inactive write signal to the memory 222. At the same time, R1L and R1U, which are lower 4 bits and higher 4 bits of data R1 input as shown in FIGS. 3 and 6, are output to the memory 220 via the bus 315 without any change. As a result, R1L and R1U are written in the address 0 of the memory 220. With respect to the two colors G and B, as a result of similar operation, data is stored in the address 0 of the memory 220 as shown in FIG. 11A.

In the second clock cycle, the first-class element 310 (1, 1) outputs the value incremented by one, i.e., an address 1, to the memories 220 and 222. At the same time, the first-class element 310 (2, 1) outputs an active write signal to the memory 220, and the first-class element 310 (3, 1) outputs an inactive write signal to the memory 222. At the same time, R2L and R2U, which are lower 4 bits and higher 4 bits of data R2 input as shown in FIGS. 3 and 6, are output to the memory 220 via the bus 315 without any change. As a result, R2L and R2U are written in the address 1 of the memory 220. After that, with respect to the two colors G and B, similar operation is repeated to the eight clock cycle, thereby storing data in the memory 220 as shown in FIG. 11A.

In the ninth clock cycle, the first-class element 310 (1, 1) outputs the address 0 to the memories 220 and 222. At the same time, the first-class element 310 (2, 1) outputs an inactive write signal to the memory 220, and the first-class element 310 (3, 1) outputs an active write signal to the memory 222. At the same time, R9L and R9U, which are lower 4 bits and higher 4 bits of data R9 input as shown in FIGS. 3 and 6, are output to the memory 222 via the bus 315 without any change. Then, the first-class element 310 (1, 1) outputs the value incremented by one to the memory 222 as an address, thereby storing data to the memory 222 as shown in FIG. 11B.

After the sequence of write operation, data is read from the memories 220 and 222.

Figure 12:
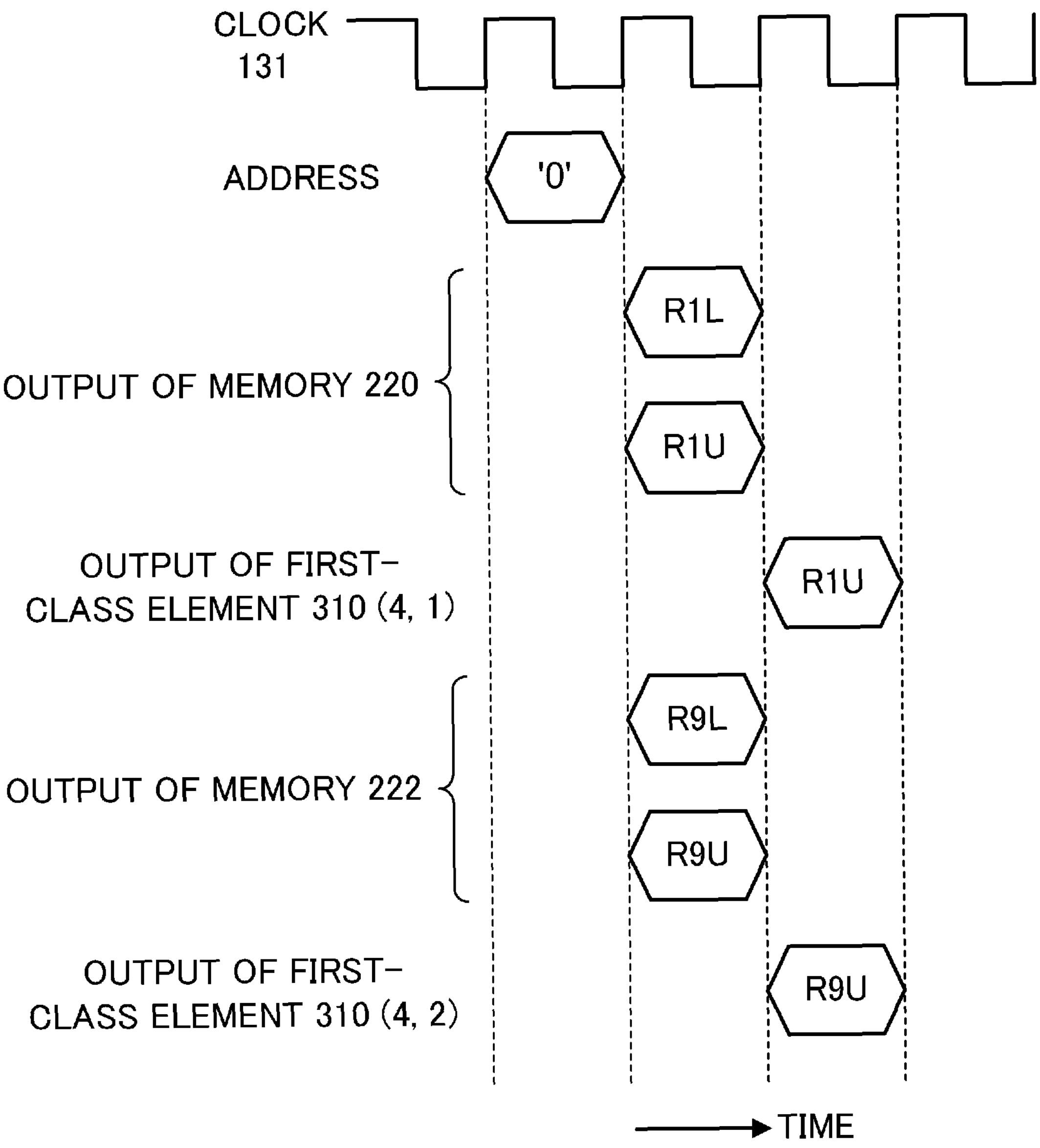
FIG. 12 illustrates another example operation timing of the programmable array of FIG. 3.

First, the first-class element 310 (1, 1) outputs the address 0 to the memories 220 and 222. At the same time, the first-class element 310 (2, 1) outputs an active read signal to the memory 220, and the first-class element 310 (3, 1) outputs an active read signal to the memory 222. As a result, as shown in FIG. 12, R1L and R1U are output from the memory 220, and R9L and R9U are output from the memory 222.

In the next cycle, R1L and R9L are output as the video data 116 outside the programmable array 200 via the bus 315. At the same time, R1U and R9U are latched by the first-class element 310 (4, 1) and the first-class element 310 (4, 2), and are output as the video data 116 outside the programmable array 200 via the bus 315 in the further next cycle. With respect to the two colors G and B, similar operation is executed, thereby outputting the video data 116 from the programmable array 200 at the timing shown in FIG. 10.

As described above, the plurality of first-class elements 310 change their operation in accordance with the configuration codes 115 and 215, thereby outputting the video data 116 as shown in FIGS. 7 and 10. Note that the structure of the first-class element 310 is not limited to what is shown in FIG. 4. The output of the video data 116 is not limited to what is shown in FIGS. 7 and 10. While in this embodiment, an example has been described where the two memories are used together with the programmable array 200, the number of the memories may be determined as appropriate.

Case 2: Generation of Control Signals 117 and 118

Next, operation of generating the control signals 117 and 118 suitable for driving the source driver 182 and the gate driver 184 included in the liquid crystal display device 150 will be described.

The number and timing to change (timing when the signals are changed to 1 or 0) of these control signals depend on the specification of the liquid crystal display device 150. Thus, what is important is that the control signal 117 or 118 is changed at preferable timing. In general, such operation is performed by providing a counter for counting a clock number, and changing a signal when the value of the counter is equal to one of a plurality of predetermined values. Operation of the control signal 117 will be described below with reference to FIGS. 2-5, and 13.

As described in the above case 1A or 1B, the configuration code 115 stored in the read-only-memory (not shown; e.g., ROM) in advance is downloaded to the programmable array 200 (see FIG. 2). The configuration code 115 is input to the configuration controller 210. The configuration code 215, which is an output of the configuration controller 210, is sequentially output to the plurality of first-class elements 310 and the second-class element 350 (FIGS. 3, 4, and 5). As a result, the configuration code 215 is stored in the configuration memories 410 and 510 of all the first-class elements 310 and the second-class element 350 included in the programmable array 200. As such, the configuration of the cases 1 and 2 are performed at the same time.

When the configuration ends, the counter 520 for 12 bits in the second-class element 350 holds an initial value 0. A first comparison value (e.g., 6) is set to the register 530 for 12 bits, and a second comparison value (e.g., 1920) is set to the register 532 for 12 bits in accordance with the configuration memory 510. The comparators 540 and 542 compare a value of the counter 520 to a value of the register 530, and a value of the counter 520 to a value of the register 532, and output 1 to the bus 315 as the comparison results 550 and 552 of 1 bit, respectively, when the compared values are equal. Different from the first-class elements 310, the counter 520, the registers 530 and 532, and the comparators 540 and 542 are for 12 bits, since resolution of the liquid crystal display device 150 in the horizontal direction has been 1024 bits or more in recent years, and 4 bits are not enough to count the resolution.

The configuration allows a first-class element 310 (5, 1) to invert an value of the register 472 and to output the inverted value to the bus 315 (FIG. 4) when input data from the bus 315 is 1. Specifically, after the configuration, the initial value 0 is stored in the register 472, and the multiplexer 480 selects the register 472 and outputs the value to the ALU 460 and to the bus 315. The multiplexer 450 selects the comparison results 550 and 552 and outputs the selected values to the ALU 460 via the bus 315. The ALU 460 performs exclusive OR operation between two inputs.

Next, the horizontal synchronization signal 113 is input to the programmable array 200. This signal is input to the counter 520 via the bus 315 (FIG. 5). As a result, the counter 520 starts increment operation from the initial value 0. When the value of the counter 520 is 6, the comparison result 550 is 1 and is output to the bus 315.

The comparison result 550 is input to the ALU 460 via the multiplexer 450 inside the first-class element 310 (5, 1) shown in FIG. 4. As a result of exclusive OR operation between the initial value 0 (i.e., 0000 in a binary number) of the register 472 and 1 (i.e., 0001 in the binary number) of the comparison result 550, 0001 in the binary number is newly stored as a value of the register 472, and the value is output to the bus 315. This value is output from the programmable array 200 as the control signal 117. That is, when the value of the counter 520 is 6, the control signal 117 is changed from 0 to 1.

Then, the counter 520 shown in FIG. 5 continues the increment operation. When the value is 1920, the comparison result 552 is 1 and is output to the bus 315. The comparison result 552 is input to the ALU 460 via the multiplexer 450 inside the first-class element 310 (5, 1) shown in FIG. 4. As a result of exclusive OR operation between the value 1 (i.e., 0001 in the binary number) of the register 472 and 1 (i.e., 0001 in the binary number) of the comparison result 552, 0000 in the binary number is newly stored as a value of the register 472, and the value is output to the bus 315. This value is output from the programmable array 200 as the control signal 117. That is, when the value of the counter 520 is 1920, the control signal 117 is changed from 1 to 0.

Figure 13:
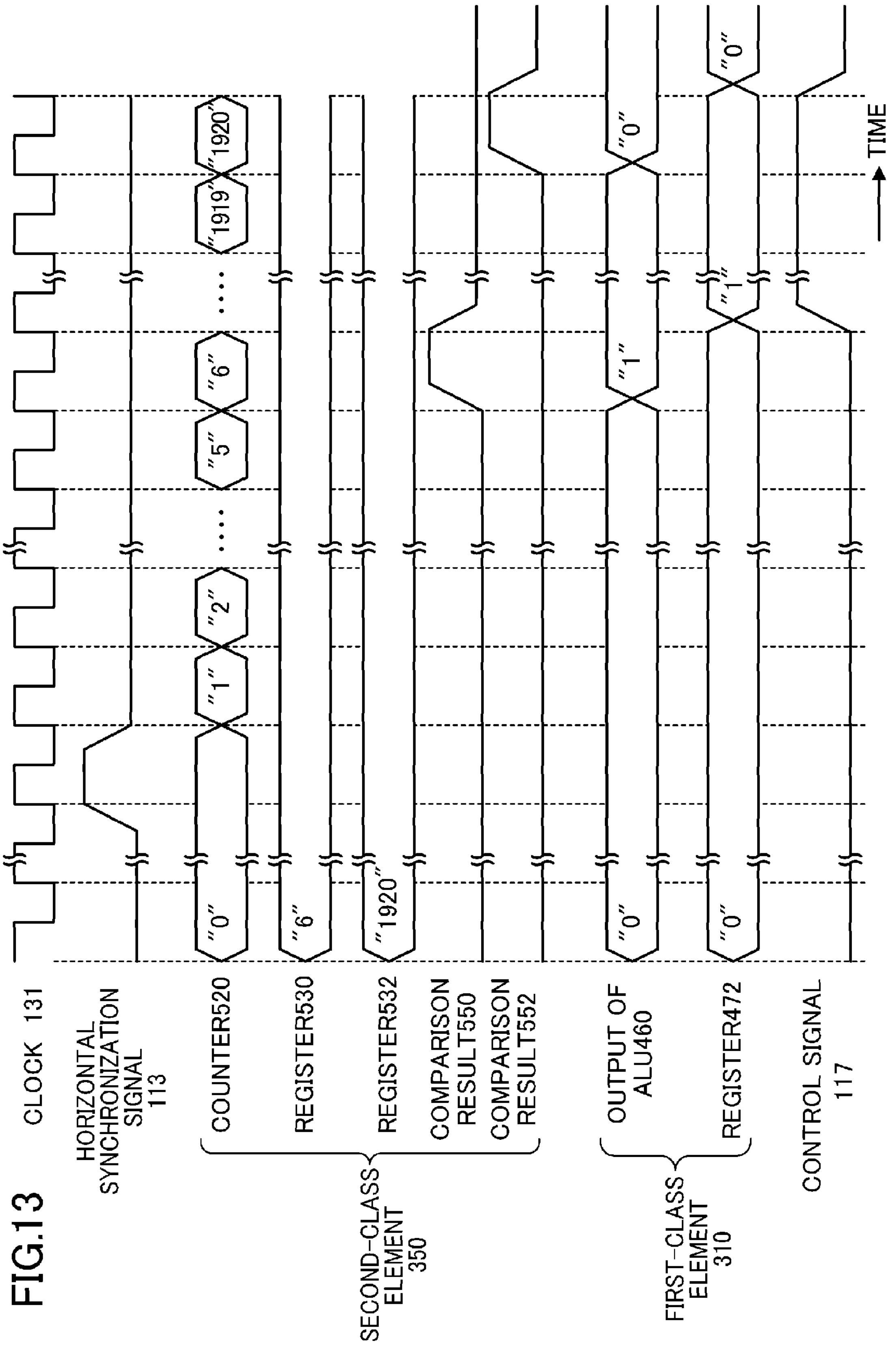
FIG. 13 is illustrates example output timing of a control signal in the programmable array of FIG. 3.

FIG. 13 illustrates the above description by a timing chart.

As clear from the above description, in this embodiment, the control signal 117 can be changed at preferable timing. Clearly, the control signal 118 can be similarly provided and thus description thereof is omitted. If the control signal 117 or 118 needs to be changed at a larger number of timing, a plurality of second-class elements 350 may be used. While the ALU inside each first-class element 310 executes the exclusive OR operation, it may be changed to other logic operations such as OR operation, thereby obtaining more various types of outputs of the control signal 117 or 118.

In this embodiment, the control signals are clearly output at preferable timing in a small-scale circuit. This is because, where the second-class element 350 shown in FIG. 5 is formed by the first-class elements 310 only, at least three first-class elements 310 are required to form the counter 520, and at least six first-class elements 310 are required to form the registers 530 and 532, and the comparators 540 and 542. In total, at least nine first-class elements 310 are required. On the other hand, the second-class element 350 can be formed by densely mounting these elements in a single element.

While in this embodiment, the control signals 117 and 118 are generated in accordance with the specification of the liquid crystal display device 150, the control signals 117 and 118 may be generated, reflecting not only the specification of the liquid crystal display device 150 but also the contents of the video data.

Figure 14:
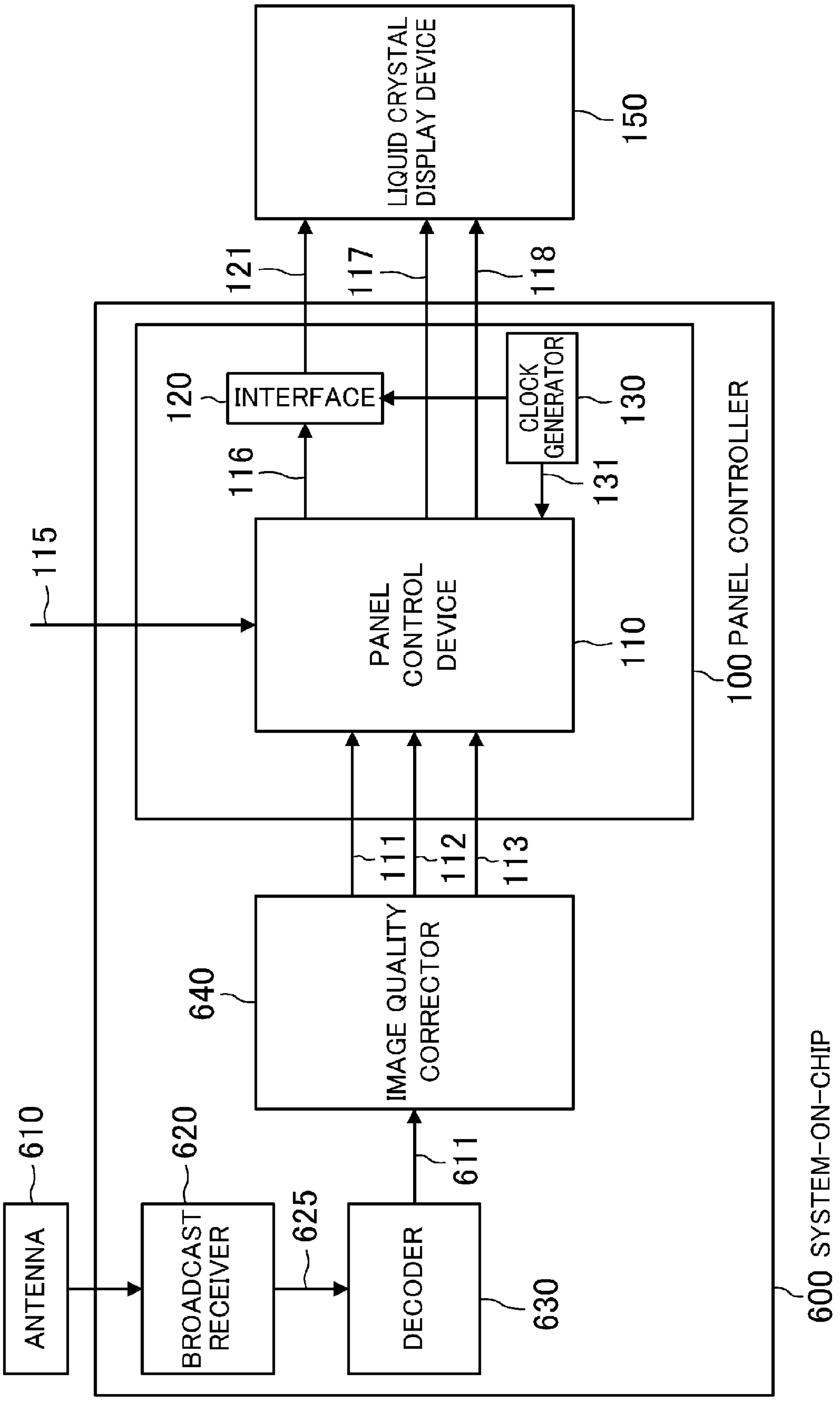
FIG. 14 is a block diagram of another configuration example of the panel control system including the panel control device according to the present disclosure.

FIG. 14 illustrates a panel control system according to this embodiment. A digital television airwave is received by an antenna 610 and its analog signal is input to a system-on-chip 600. After being input to a broadcast receiver 620 built in the system-on-chip 600, the analog signal is converted to a digital signal including video data. Usually, the video data of the digital signal is coded by an image codec such as MPEG-2 and H.264. The coded data 625 is decoded by a decoder 630 and is output as video data 611. The video data 611 is subject to color change, correction of the image outline, etc. in an image quality corrector 640, and is output to the panel controller 100 as the video data 111. Accordingly, the vertical synchronization signal 112 and the horizontal synchronization signal 113 are also output to the panel controller 100.

While in FIG. 14, the vertical synchronization signal 112 and the horizontal synchronization signal 113 are output from the image quality corrector 640, the signals may be output from the decoder 630, the broadcast receiver 620, or a clock generator (not shown) built in the system-on-chip 600.

According to this embodiment, the video data 111 can be transferred with extremely low power consumption, as compared to the case where an LSI including the panel controller 100 is formed separately from the system-on-chip 600. This is because, where an LSI including the panel controller 100 is separately formed, a dedicated LSI terminal and a dedicated terminal input/output section are required to transfer the video data 111. This terminal usually transfers with a voltage which is more than double of the power supply voltage of the LSI. In addition, the video data 111 usually requires a data width of 8 or more bits, and a wide band frequency of 75 MHz or more as the transfer clock frequency.

In this embodiment, since the LSI including the panel controller 100 is built in the system-on-chip 600, it is clear that the number of parts of the LSI for a set product (e.g., a digital television) is reduced.

Clearly, in the above-described example, the numbers of the first-class elements and the second-class element built in the programmable array, and the number of the memories included in the panel control device can be determined as appropriate, and the input and output formats of the video data are not limited to the three colors of R, G, and B. While in this embodiment, the digital television airwave is received by the antenna 610, and its analog signal is input to the system-on-chip 600, the analog signal is not necessarily input via the antenna, but may be input via a cable. Alternatively, it may be input as a digital signal to the system-on-chip 600 via digital television broadcast or a medium (e.g., a digital video disk) storing digital television broadcast. Similarly, the video data may be input as a digital signal to the system-on-chip 600 via a medium storing contents (e.g., a movie and personal home video) which are not the digital television broadcast. In these cases, the digital signal is not input to the broadcast receiver 620, but to the decoder 630. Furthermore, the video data may be uncompressed video data output from a player (e.g., a DVD player and a Blu-ray Disc player) for playing the above recoding media. In this case, the uncompressed video data is directly input to the image quality corrector 640 as the video data 611.

As described above, the panel control device and the panel control system according to the present disclosure require a small circuit area, are suitable for SoC mounting, and are advantageous in driving a liquid crystal display device having various specifications also in the future. Therefore, the panel control device and the panel control system according to the present disclosure are useful for a computer display, a liquid crystal display device of a digital television, etc.

What is claimed is:

1. A panel control device for outputting video data and a control signal to a liquid crystal display device, the panel control device comprising:

a programmable array configured to receive source video data, a synchronization signal, and to operate in accordance with a configuration code including information on specifications of the video data and the control signal of the liquid crystal display device; and a first memory configured to input/output data to/from the programmable array, wherein:

the programmable array includes a plurality of first-type elements arranged in a matrix, at least one second-type element and at least one bus line, at least one of the plurality of first-type elements includes:

a second memory configured to store a first designated configuration code for the at least one of the plurality of first-type elements as first control information;

a calculator configured to operate based on the first control information output from the second memory, and to receive data from the bus line;

a first register configured to hold output data of the calculator; and an output circuit configured to output, to the bus line, output data from the first register, and the second-type element includes:

a third memory configured to store a second designated configuration code for the second-type element as second control information, a counter configured to receive the synchronization signal from the bus line, and to operate based on the second control information output from the third memory, a second register and a third register;

a first comparator configured to compare outputs from the counter and the second register, and to output a compared result to the bus line; and a second comparator configured to compare outputs from the counter and the third register, and to output a compared result to the bus line.

2. The panel control device of claim 1, wherein the counter has a larger bit width than the at least one of the plurality of first-type elements.

3. The panel control device of claim 1, wherein:

the at least one of the plurality of first-type elements includes a plurality of registers and the output circuit includes a multiplexer configured to select one of output data from the plurality of registers based on the first control information output from the second memory.

4. The panel control device of claim 3, wherein the calculator is configured to receive output from the multiplexer.

5. The panel control device of claim 1, wherein:

the at least one of the plurality of first-type elements further includes a multiplexer configured to select a fixed value or the data received from the bus line, and to output a selected result to the calculator.

6. The panel control device of claim 1, wherein the calculator is an arithmetic calculator.

7. The panel control device of claim 1, wherein the bus line is a programmable bus line.

8. The panel control device of claim 1, wherein the synchronization signal is a vertical synchronization signal or a horizontal synchronization signal.

9. A panel control system comprising in a single chip:

a broadcast receiver configured to receive digital television broadcast;

a decoder configured to decode compressed video data output from the broadcast receiver;

a panel control device configured to receive the video data output from the decoder, a synchronization signal; and the panel control device of claim 1.

10. A panel control device for outputting video data and a control signal to a liquid crystal display device, the panel control device comprising:

a programmable logic circuit for performing outputting of the video data and the control signal, and configured to receive source video data and a synchronization signal, and to operate in accordance with a configuration code including information on specifications of the video data and the control signal of the liquid crystal display device; and a first memory configured to input/output data to/from the programmable logic circuit, wherein:

the programmable logic circuit includes at least one first-type element, at least one second-type element and at least one bus line, the first-type element includes:

a first configuration code input unit configured to receive a first designated configuration code for the first-type element as first control information;

a calculator configured to operate based on the first control information output from the first configuration code input unit, and to receive data from the bus line;

a register configured to hold output data of the calculator; and an output circuit configured to output, to the bus line, output data from the register, and the second-type element includes:

a second configuration code input unit configured to receive a second designated configuration code for the second-type element as second control information, and a counter configured to receive the synchronization signal from the bus line, and to operate based on the second control information output from the second configuration code input unit, wherein all of processing performed by the programmable logic circuit is related to generating the video data and the control signal, said video data and said control signal being output by the panel control device.

11. The panel control device of claim 10, wherein the first memory includes plural memories disposed outside of the programmable logic circuit.

12. The panel control device of claim 10, wherein the synchronization signal is a vertical synchronization signal or a horizontal synchronization signal.

13. A device comprising:
- a programmable logic circuit configured to operate in accordance with a configuration code; and
- a first memory configured to input/output data to/from the programmable logic circuit, wherein:
- the programmable logic circuit includes a plurality of first-type elements, at least one second-type element and at least one bus line,
- at least one of the plurality of first-type elements includes:
  - a first configuration code input unit configured to receive a first designated configuration code for the at least one of the plurality of first-type elements as first control information;
  - a calculator configured to operate based on the first control information output from the first configuration code input unit, and to receive data from the bus line;
  - a register configured to hold output data of the calculator; and
  - an output circuit configured to output, to the bus line, output data from the register, and
- the second-type element includes:
  - a second configuration code input unit configured to receive a second designated configuration code for the second-type element as second control information,
  - a counter configured to receive a signal from the bus line, and to operate based on the second control information output from the second configuration code input unit,
  - a first register and a second register;
  - a first comparator configured to compare outputs from the counter and the first register, and to output a compared result to the bus line; and
  - a second comparator configured to compare outputs from the counter and the second register, and to output a compared result to the bus line.

* * * * *